Dec. 12, 1933.  E. D. EDWARDS  1,939,342
CAKE HOLDER
Filed March 30, 1932   2 Sheets-Sheet 1

INVENTOR.
Emery D. Edwards
BY
J. Kaplan
ATTORNEY.

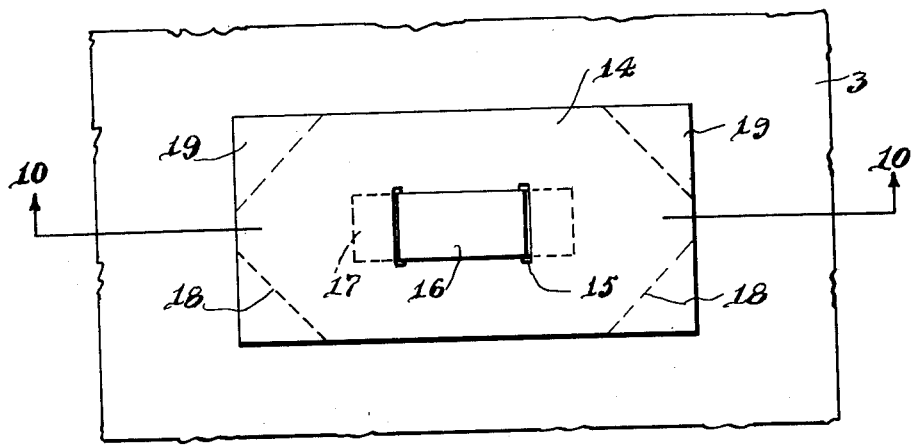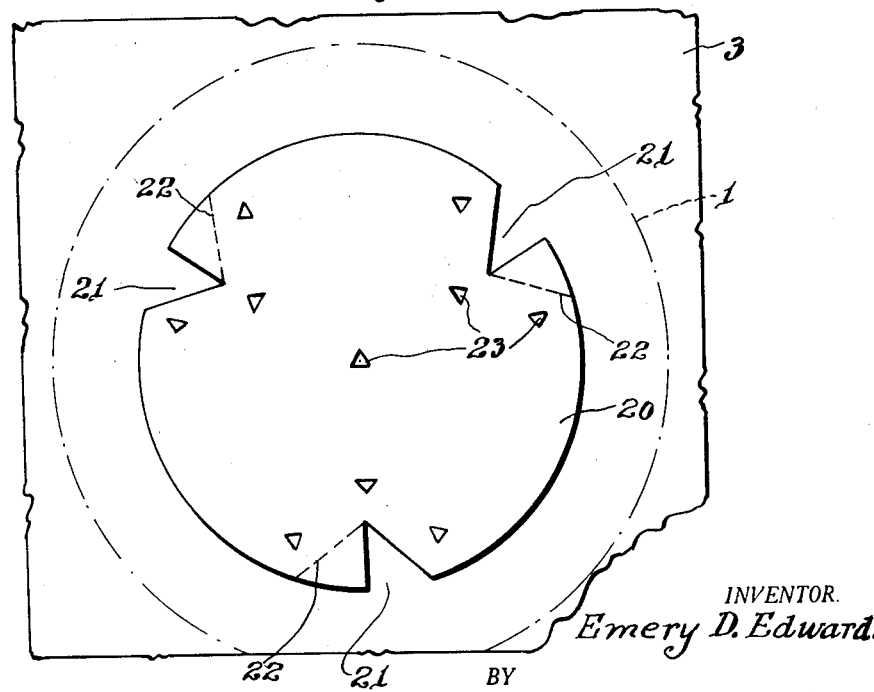

Patented Dec. 12, 1933

1,939,342

UNITED STATES PATENT OFFICE 1,939,342

CAKE HOLDER

Emery David Edwards, Bremerton, Wash., assignor to Sanicut Manufacturing Co., Bremerton, Wash., a corporation of Washington Application March 30, 1932. Serial No. 602,046

3 Claims. (Cl. 206—46)

This invention relates to cake holders.

Very often cakes are damaged by striking the sides of the box during the course of delivery. It is therefore the object of this invention to provide means to hold the cake in place in their boxes so as not to come in contact with the walls of the said boxes.

Another object of the invention is to provide a holding element having a set of prongs for puncturing the bottom of the cake and holding same in place against any slippage or movement.

Other objects will appear as the disclosure progresses. The drawings are intended to merely indicate a possible embodiment of the invention. It is obvious that the actual needs of manufacture may necessitate certain mechanical changes. It is therefore not intended to limit the invention to the embodiment illustrated, but rather to define such limits in the appended claims.

For a more general understanding of the invention, attention is called to the drawings. In these drawings like reference characters denote like parts throughout the specification.

In the drawings:

Figure 9 is a top plan view of a modified form of the invention.

Figure 10 is a section on line 10—10 of Figure 9 and

Figure 11 is a plan view of still another modified form of the invention.

Figure 1:
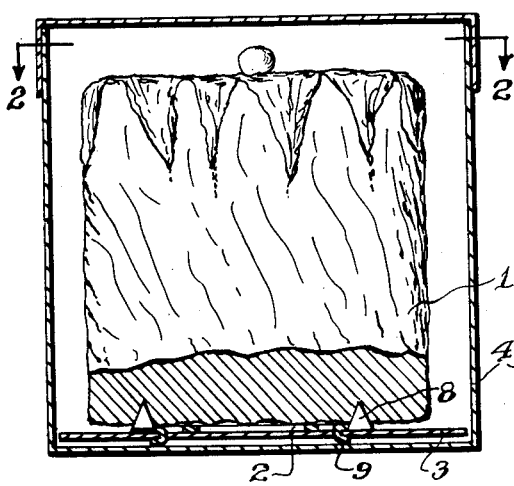
Figure 1 is a view showing the means for holding a cake in place in a box, the box being shown in cross section.
Figure 2:
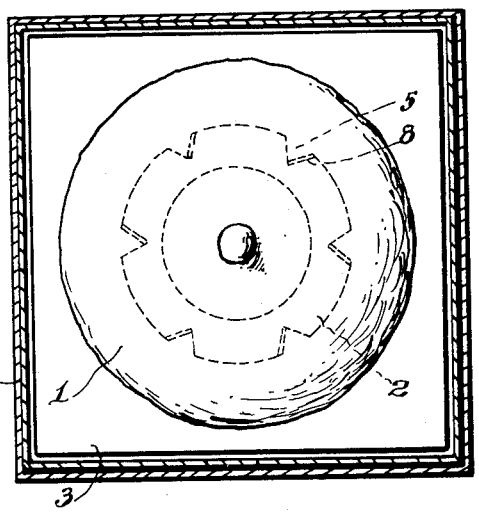
Figure 2 is a section on line 2—2 of Figure 1.
Figure 8:
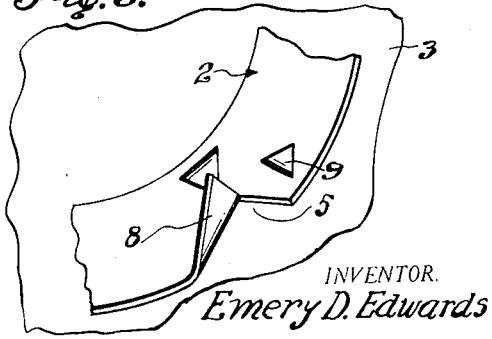
Figure 8 is an enlarged detail of a portion of the holding element shown in Figure 3 but with the prong bent up in a vertical position.

Referring to the drawings in detail, numeral 1 designates the cake resting on a holding element 2 attached to the mat 3 which acts as a base; the whole being enclosed in a box 4. The mat is approximately the size of the interior of the box so it will not move around. The holding element comprises a flat metallic ring provided with notches 5 at its periphery. The face of the ring adjacent the notches are scored as shown in dotted lines as at 6 so as to enable the portions 7 of the ring between the score and the notches to be easily bent up on the scored line in an upright position to form the prongs 8 as indicated in Figure 8. When the cake is placed on the prongs they will puncture and enter the bottom of the cake and prevent same from moving. Cut in the face of the ring are a series of triangular shaped tongues 9 which are bent downward and grip the mat as clearly shown in Figure 1.

Figure 4:
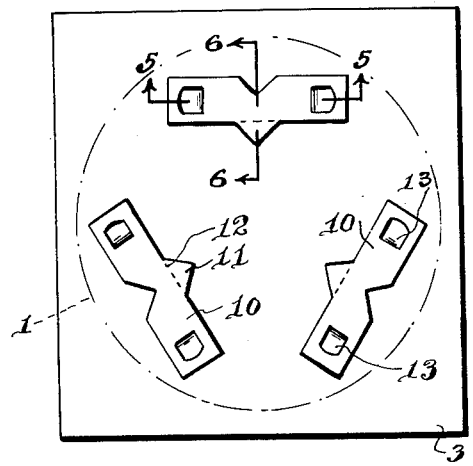
Figure 4 is a modified form of the holding device.
Figure 5:
Figure 5 is a section on line 5—5 of Figure 4.
Figure 6:
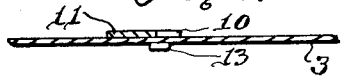
Figure 6 is a section on line 6—6 of Figure 4.
Figure 7:
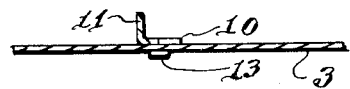
Figure 7 is a similar view as Figure 6 but showing one of the prongs bent up in a vertical position.

In the modified form of the invention shown in Figure 4 three holding elements 10 arranged concentric with the center of the mat 3 are used to keep the cake in place. Each of the elements are stamped from metal and comprise a pointed extension 11 which when bent upwardly on the scored line 12 forms a prong adapted to enter the cake. Cut in ends of the element are tongues 13 which pass through the mat 3 as indicated in Figure 5 and hold the said elements in place.

In the form of the invention shown in Figure 9 the holding element 14 comprises a flat sheet of soft metal with slots 15 in the center in which pass the strap 16 for attaching the holding element to the mat 3. As indicated in Figure 10 the ends 17 of the strap are bent outwardly and against the under side of the mat. At the four corners of the holding element are scored lines 18 forming a guiding line on which to bend the corners 19 upwardly to form prongs which puncture and enter the cake.

Figure 3:
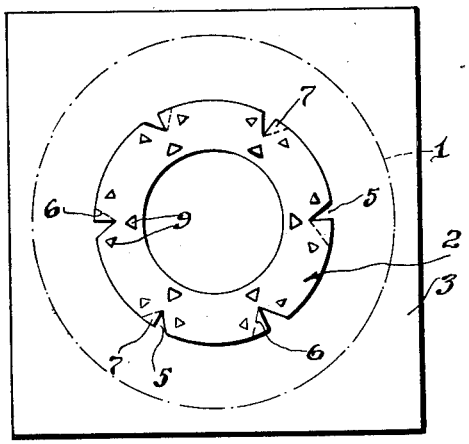
Figure 3 is a top plan view showing the holding device.

In the form of the invention shown in Figure 11 the holding element 20 consists of a circular metallic disk provided with notches 21 on its periphery. Running from the base of the notches to the edge of disk are scored lines 22 to enable the portions of the disk between the score and the notch to be easily bent upwardly on the scored line to form the prong for entering the bottom of cake. Cut in the disk are triangular shaped tongues 23 which are adapted to fasten the holding element to the mat similar to the tongues 9 shown in Figure 3.

It will thus be seen that I have provided a simple and efficient means for keeping a cake in a box from being damaged or broken during transit. The prongs of the holding elements are normally bent down flat so they will occupy a minimum amount of space when stacked up. The prongs are arranged at periphery of the holding elements so they can be conveniently lifted up in a vertical position by the finger. The drawings show the holding elements attached to a separate sheet of cardboard or mat. However if found expedient the holding elements can be directly attached to the bottom of the box.

Also the said sheets of cardboard or mats can be made in the form of doilies and served directly on the table and attached to the cake.

Having described my invention, I claim:

1. In a cake box, a base member of greater area than the cake, said base member being provided with metallic holding means within the confines of the space occupied by the cake, said holding means comprising a flat plate cut and scored to provide triangular portions which normally lie flat against the base and adapted to be bent up to form prongs.

2. In a cake box, a base member of greater area than the cake, said base member being provided with metallic holding means within the confines of the space occupied by the cake, said holding means comprising a series of elements cut and scored to provide triangular portions which normally lie flat against the base and adapted to be bent up to form prongs.

3. In a cake box, a base member of greater area than the cake, said base member being provided with metallic holding means within the confines of the space occupied by the cake, said holding means comprising a flat plate scored at the corners to provide triangular portions which normally lie flat against the base and adapted to be bent upwardly to form prongs.

EMERY DAVID EDWARDS.